United States Patent
Demmo et al.

(10) Patent No.: US 9,587,988 B1
(45) Date of Patent: Mar. 7, 2017

(54) TEMPERATURE SENSING SYSTEM

(71) Applicants: Kenneth Demmo, Oviedo, FL (US); Kelly Demmo, Oviedo, FL (US)

(72) Inventors: Kenneth Demmo, Oviedo, FL (US); Kelly Demmo, Oviedo, FL (US)

( * ) Notice: Subject to any disclaimer, the term of this patent is extended or adjusted under 35 U.S.C. 154(b) by 0 days.

(21) Appl. No.: 14/826,874

(22) Filed: Aug. 14, 2015

(51) Int. Cl.
| | |
|---|---|
| *B60Q 1/00* | (2006.01) |
| *G01K 1/02* | (2006.01) |
| *G01K 13/00* | (2006.01) |
| *G08B 21/18* | (2006.01) |
| *B60Q 9/00* | (2006.01) |

(52) U.S. Cl.
CPC ............. *G01K 1/02* (2013.01); *B60Q 1/0023* (2013.01); *B60Q 9/00* (2013.01); *G01K 13/00* (2013.01); *G08B 21/182* (2013.01)

(58) Field of Classification Search
CPC ........ G01K 1/02; G01K 13/00; G08B 21/182; B60Q 9/00; B60Q 1/0023
USPC .......................................................... 340/449
See application file for complete search history.

(56) References Cited

U.S. PATENT DOCUMENTS

| | | | |
|---|---|---|---|
| 6,544,614 B1 | 4/2003 | Huffer et al. | |
| 6,592,255 B1 | 7/2003 | Duroux et al. | |
| 7,028,634 B1 | 4/2006 | Lee | |
| 7,112,766 B2 | 9/2006 | Lerner | |
| 8,733,833 B2 | 5/2014 | Dickinson | |
| 2002/0097777 A1 | 7/2002 | Ronci | |
| 2004/0004991 A1 | 1/2004 | Wu | |
| 2005/0163189 A1* | 7/2005 | Nakazawa | G01K 13/002 374/100 |
| 2008/0144699 A1 | 6/2008 | Plevich et al. | |
| 2011/0163579 A1 | 7/2011 | Watson | |
| 2013/0309440 A1* | 11/2013 | Coulter | H05K 7/1487 428/99 |

* cited by examiner

*Primary Examiner* — Tanmay Shah

(57) ABSTRACT

A temperature sensing system includes a vehicle that has a seat. An alarm is removably attached to the seat and the alarm is in thermal communication with an interior of the vehicle. The alarm issues a visual alert when a temperature of within the vehicle exceeds a trigger temperature. Thus, the alarm alerts an observer that the temperature within the vehicle exceeds the trigger temperature.

4 Claims, 3 Drawing Sheets

TEMPERATURE SENSING SYSTEM

BACKGROUND OF THE DISCLOSURE

Field of the Disclosure

The disclosure relates to temperature sensing devices and more particularly pertains to a new temperature sensing device for alerting an observer that a temperature within a vehicle exceeds a trigger temperature.

SUMMARY OF THE DISCLOSURE

An embodiment of the disclosure meets the needs presented above by generally comprising a vehicle that has a seat. An alarm is removably attached to the seat and the alarm is in thermal communication with an interior of the vehicle. The alarm issues a visual alert when a temperature of within the vehicle exceeds a trigger temperature. Thus, the alarm alerts an observer that the temperature within the vehicle exceeds the trigger temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
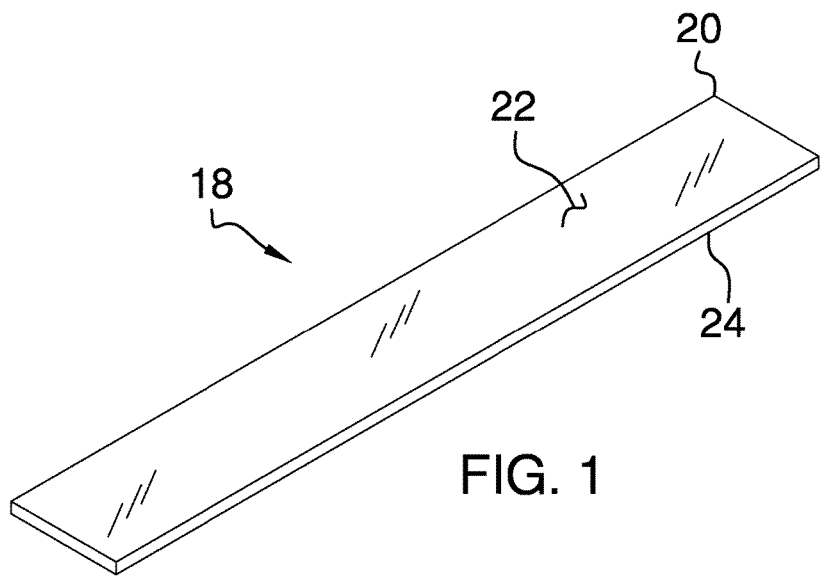
FIG. 1 is a top perspective view of a temperature sensing system according to an embodiment of the disclosure.
Figure 2:
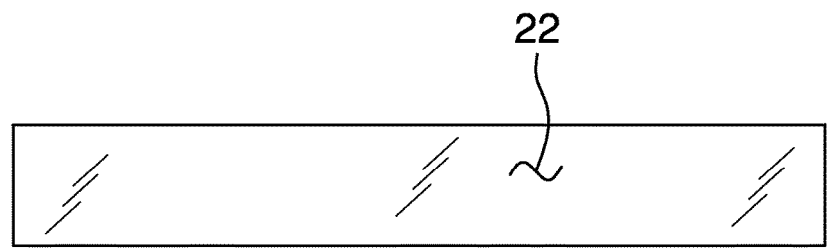
FIG. 2 is a top view of an embodiment of the disclosure.
Figure 3:
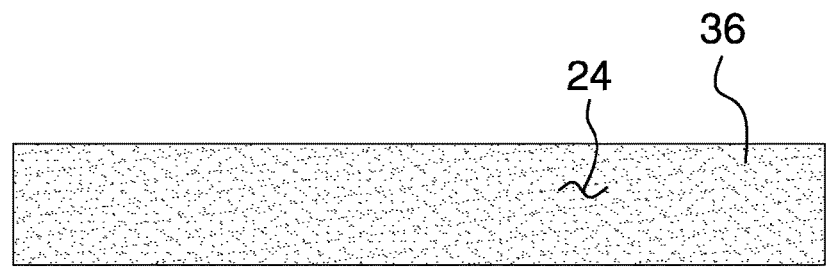
FIG. 3 is a bottom view of an embodiment of the disclosure.
Figure 4:
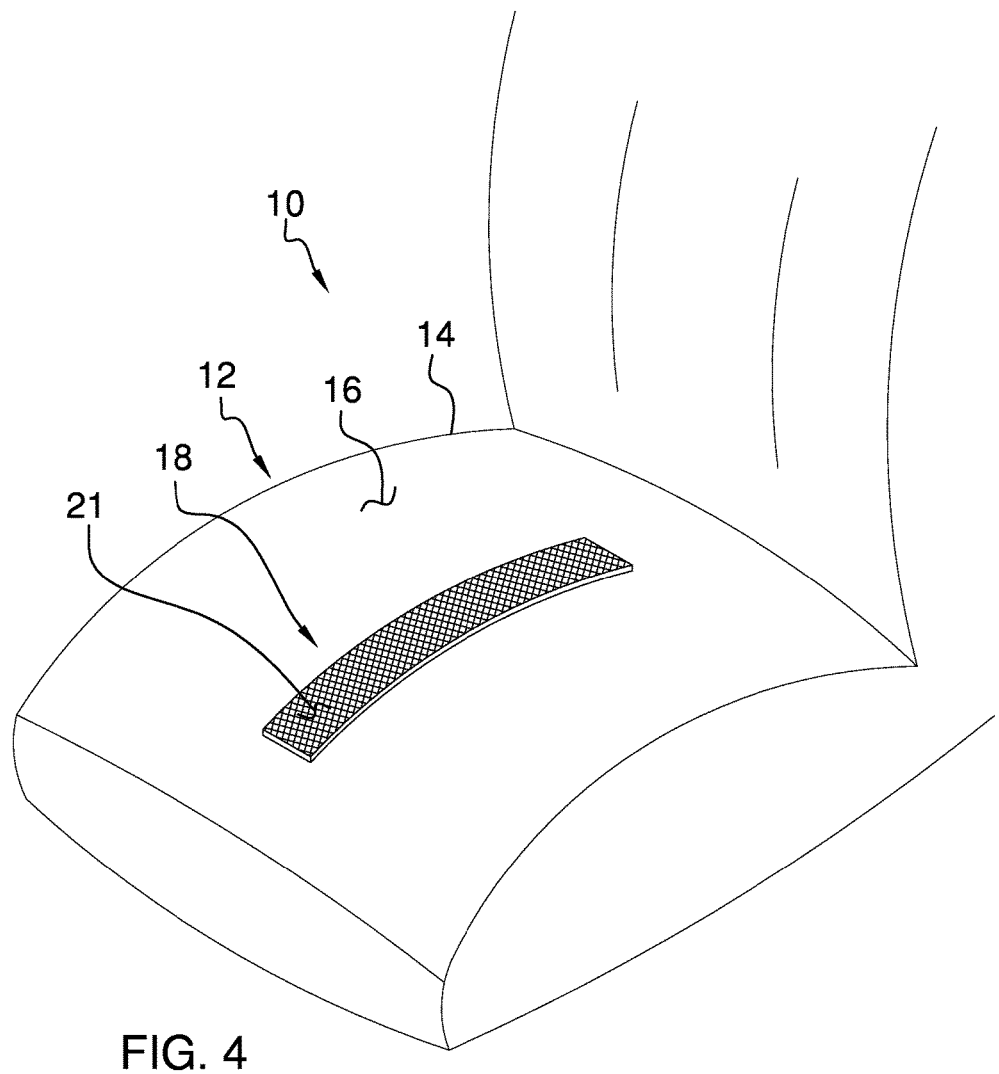
FIG. 4 is a perspective in-use view of an embodiment of the disclosure.
Figure 5:
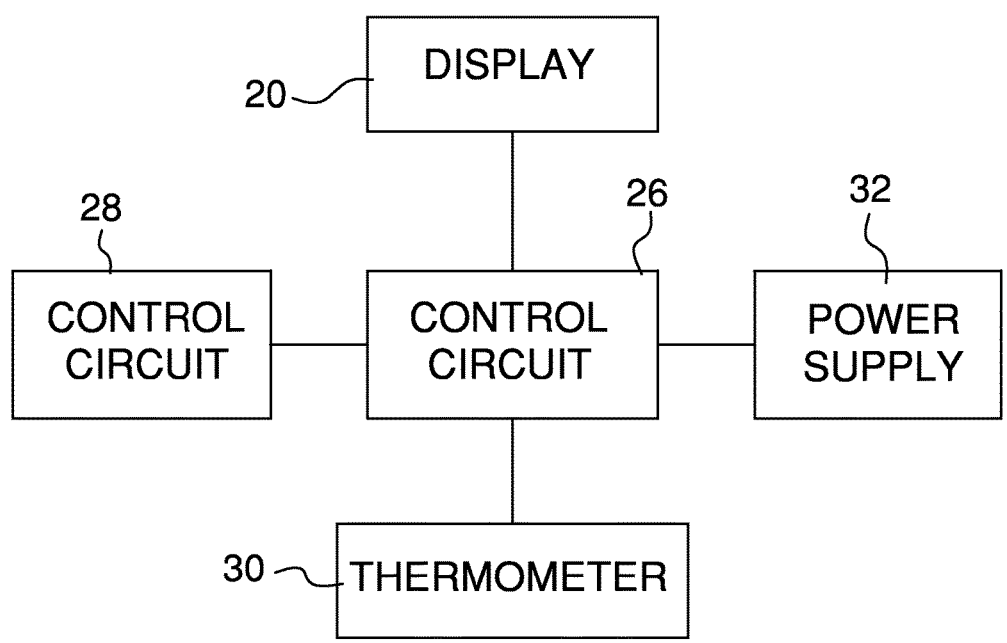
FIG. 5 is a schematic view of an embodiment of the disclosure.

With reference now to the drawings, and in particular to FIGS. 1 through 5 thereof, a new temperature sensing device embodying the principles and concepts of an embodiment of the disclosure and generally designated by the reference numeral 10 will be described.

As best illustrated in FIGS. 1 through 5, the temperature sensing system 10 generally comprises a vehicle 12 that has a seat 14 and the seat 14 has a top surface 16. The vehicle 12 may be a passenger vehicle or the like. An alarm 18 is removably attached to the seat 14 and the alarm 18 is in thermal communication with an interior of the vehicle 12. The alarm 18 issues a visual alert when a temperature of within the vehicle 12 exceeds a trigger temperature. Thus, the alarm 18 alerts an observer that the temperature within the vehicle 12 exceeds the trigger temperature.

The alarm 18 comprises a display 20 that has a top surface 22 and a bottom surface 24. The display 20 is actuatable such that the top surface 22 of the display 20 displays a visual alert and the visual alert comprises a color. The display 20 is positioned on the top surface 16 of the seat 14 such that the display 20 may be visible to the observer. The color may be the color red and the display 20 may comprise an LCD or the like. The display 20 may have a length ranging between approximately 5 inches and 9 inches and a width ranging between approximately 1 inch and 2 inches.

A control circuit 26 is attached to the display 20 and the control circuit 26 includes an electronic memory 28. The electronic memory 28 stores a trigger temperature and the control circuit 26 is electrically coupled to the display 20. The control circuit 26 may comprise an electronic processor or the like and the electronic memory 28 may comprise ROM or the like.

A thermometer 30 is attached to the display 20 and the thermometer 30 is electrically coupled to the control circuit 26. The thermometer 30 detects a temperature within the vehicle 12 and the thermometer 30 may be an electronic thermometer of any conventional design. The control circuit 26 actuates the display 20 to display the visual alert when the thermometer 30 detects a temperature that exceeds the trigger temperature. Thus, the display 20 alerts the observer that the top surface 16 of the seat 14 is hot enough to potentially burn the observer. The trigger temperature may be approximately 110° Fahrenheit.

A power supply 32 is attached to the display 20 and the power supply 32 is electrically coupled to the control circuit 26. The power supply 32 comprises at least one battery 34. A fastener 36 is coupled to the alarm 18 and the fastener 36 is positioned on the bottom surface 24 of the display 20. The fastener 36 engages the top surface 16 of the seat 14 such that the display 20 is retained on the seat 14. The fastener 36 may comprise a hook and loop fastener, an adhesive strip or other multiple use fastener.

In use, the display 20 is attached to the top surface 16 of the seat 14. The display 20 displays the visual alert when the temperature within the vehicle 12 exceeds the trigger temperature. Thus, the display 20 is highly visible to the observer before the observer sits on the seat 14. The display 20 ceases displaying the visual alert when the temperature within the vehicle 12 does exceed the trigger temperature.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A temperature sensing system configured to issue an alert when a temperature in a vehicle exceeds a trigger temperature, said system comprising:
   a vehicle having a seat;
   an alarm being removably attached to said seat, said alarm being in thermal communication with an interior of said vehicle, said alarm issuing a visual alert when a temperature of within said vehicle exceeds a trigger temperature wherein said alarm is configured to alert an observer that the temperature within said vehicle exceeds said trigger temperature, wherein said alarm comprises a display having a top surface and a bottom surface, display being actuatable to display a visual alert, said visual alert comprising a color, said display being positioned on said top surface of said seat wherein said display is configured to be visible to the observer;
   a control circuit being attached to said display, said control circuit including an electronic memory, said electronic memory storing a trigger temperature, said control circuit being electrically coupled to said display;
   a thermometer being attached to said display, said thermometer being electrically coupled to said control circuit, said thermometer detecting a temperature within said vehicle; and
   wherein said control circuit actuating said display to display said visual alert when said thermometer detects a temperature that exceeds said trigger temperature wherein said display is configured to alert the observer that said top surface of said seat is hot.

2. The system according to claim 1, further comprising a power supply being attached to said display, said power supply being electrically coupled to said control circuit, said power supply comprising at least one battery.

3. The system according to claim 1, further comprising:
   said seat having a top surface;
   a display, said display having a bottom surface; and
   a fastener being coupled to said alarm, said fastener being positioned on said bottom surface of said display, said fastener engaging said top surface of said seat such that said display is retained on said seat.

4. A temperature sensing system configured to issue an alert when a temperature in a vehicle exceeds a trigger temperature, said system comprising:
   a vehicle having a seat, said seat having a top surface; and
   an alarm being removably attached to said seat, said alarm being in thermal communication with an interior of said vehicle, said alarm issuing a visual alert when a temperature of within said vehicle exceeds a trigger temperature wherein said alarm is configured to alert an observer that the temperature within said vehicle exceeds said trigger temperature, said alarm comprising:
      a display having a top surface and a bottom surface, display being actuatable to display a visual alert, said visual alert comprising a color, said display being positioned on said top surface of said seat wherein said display is configured to be visible to the observer,
      a control circuit being attached to said display, said control circuit including an electronic memory, said electronic memory storing a trigger temperature, said control circuit being electrically coupled to said display,
      a thermometer being attached to said display, said thermometer being electrically coupled to said control circuit, said thermometer detecting a temperature within said vehicle, said control circuit actuating said display to display said visual alert when said thermometer detects a temperature that exceeds said trigger temperature wherein said display is configured to alert the observer that said top surface of said seat is hot, and
      a power supply being attached to said display, said power supply being electrically coupled to said control circuit, said power supply comprising at least one battery; and
   a fastener being coupled to said alarm, said fastener being positioned on said bottom surface of said display, said fastener engaging said top surface of said seat such that said display is retained on said seat.

* * * * *